United States Patent [19]
Akashi et al.

[11] Patent Number: 5,498,450
[45] Date of Patent: Mar. 12, 1996

[54] LIQUID CRYSTAL-POLYMER COMPOSITE FILM, ELECTRO-OPTICAL ELEMENT USING THE SAME, AND PROCESS FOR PRODUCING ELECTRO-OPTICAL ELEMENT

[75] Inventors: Ryojiro Akashi; Masanobu Ninomiya, both of Minami Ashigara, Japan

[73] Assignee: Fuji Xerox Co., Ltd., Tokyo, Japan

[21] Appl. No.: 151,193

[22] Filed: Nov. 12, 1993

[30] Foreign Application Priority Data

Nov. 18, 1992 [JP] Japan .................................. 4-331190
Dec. 1, 1992 [JP] Japan .................................. 4-343575

[51] Int. Cl.⁶ .................................................. C09K 19/52
[52] U.S. Cl. ........................ 428/1; 252/299.01; 359/93; 359/94; 359/246; 428/213; 525/106
[58] Field of Search ........................ 428/1, 213; 359/93, 359/94, 246; 252/299.01; 525/106

[56] References Cited

U.S. PATENT DOCUMENTS

| | | | |
|---|---|---|---|
| 4,435,047 | 3/1984 | Fergason | 428/1 |
| 4,952,334 | 8/1990 | Hakemi | 428/1 |
| 4,994,204 | 2/1991 | Doane | 428/1 |
| 5,093,471 | 3/1992 | West | 428/1 |

FOREIGN PATENT DOCUMENTS

| | | |
|---|---|---|
| 58-501631 | 9/1983 | Japan . |
| 61-502128 | 9/1986 | Japan . |
| 62-2231 | 1/1987 | Japan . |
| 63-43993 | 2/1988 | Japan . |
| 63-137211 | 6/1988 | Japan . |
| 64-62615 | 3/1989 | Japan . |
| 1-312527 | 12/1989 | Japan . |
| 2-55787 | 2/1990 | Japan . |
| 3-52843 | 8/1991 | Japan . |

OTHER PUBLICATIONS

Ringsdorf et al.; "Liquid Crystalline Side Chain Polymers With Low Glass Transition Temperatures" *Makromol. Chem., Rapid Commun.* 3; 1982; pp. 557–562.
Finkelmann et al.; "Model Considerations and Examples of Enantiotropic Liquid Crystalline Polymers" *Makromol. Chem.* 179; 1978; pp. 273–276.
Shibaev et al.; "Thermotropic Liquid–Crystalline Polymers–VI" *Eur. Polym.* vol. 18, 1982; pp. 651–659.
Nakamura et al; "Application of Side Chain Type Liquid Crystal Polymer for Display and Recording Devices" *Mol. Cryst. Liq. Cryst.* vol. 169; 1989; pp. 167–192.

*Primary Examiner*—Nasser Ahmad
*Attorney, Agent, or Firm*—Oliff & Berridge

[57] ABSTRACT

A liquid crystal-polymer composite film comprising (1) a high-molecular weight compound containing at least one kind of monomer units providing a side chain having a liquid crystal nature and at least one kind of monomer units providing a side chain having no liquid crystal nature and (2) a low-molecular weight liquid crystal, the high-molecular weight compound (1) and the low-molecular weight liquid crystal (2) being in separate phases, and the monomer units providing a side chain having no liquid crystal nature being crosslinked; and an electro-optical element comprising a pair of substrates each having an electrode having interposed therebetween a liquid crystal-polymer composite film comprising (2) a low-molecular weight liquid crystal and (1) a high-molecular weight compound in separate phases, the substrates each having a surface comprising a material having a reactive group on the side in contact with the composite film, the reactive group being chemically bonded to the high-molecular weight compound (1) in the composite film.

15 Claims, 3 Drawing Sheets

LIQUID CRYSTAL-POLYMER COMPOSITE FILM, ELECTRO-OPTICAL ELEMENT USING THE SAME, AND PROCESS FOR PRODUCING ELECTRO-OPTICAL ELEMENT

FIELD OF THE INVENTION

This invention relates to a liquid crystal-polymer composite film, an electro-optical element using the same, and a process for producing the element. More particularly, it relates to a liquid crystal-polymer composite film which is widely useful in display elements, light controlling elements, optical modulation elements, optical shutters, memory elements, etc., an electro-optical element using the same, and a process for producing the element.

BACKGROUND OF THE INVENTION

Low-molecular weight liquid crystal compounds are typically useful as display materials for flat panel displays and have been widely used in TN mode liquid crystal displays, e.g., digital watches, and STN mode liquid crystal displays, e.g., lap-top computers and lap-top word processors. In these displays, "on" (transparent) and "off" (non-transparent) states are controlled by utilizing the phenomenon that the light transmitted through the liquid crystal layer changes its plane of polarization with a voltage applied. Therefore, the devices must have a pair of polarizing sheets in which the liquid crystal layer is sandwiched. Further, an orientation treatment is essentially needed for the liquid crystal layer to have specific orientations.

In recent years, hybrid type liquid crystal display elements have been proposed, in which a low-molecular weight liquid crystal compound is supported in a polymeric binder by dispersion or encapsulization as disclosed, e.g., in U.S. Pat. No. 4,435,047, JP-W-58-501631 (the term JP-W as used herein means an "unexamined published international patent application"), JP-W-61-502128, JP-A-62-2231 (the term "JP-A" as used herein means an "unexamined published Japanese patent application"), JP-A-64-62615, JP-A-1-312527, and JP-A-2-55787.

More specifically, the composite film disclosed in JP-B-3-52843 (the term "JP-B" as used herein means an "examined published Japanese patent application") and JP-W-58-501631 comprises polyvinyl alcohol having dispersed therein microcapsules of a nematic liquid crystal material. With no voltage applied, the nematic liquid crystal in the microcapsules are oriented along the capsule wall and therefore scatters incident light. With voltage applied, the nematic liquid crystal is oriented in the direction of the applied electrical field and therefore transmits incident light. JP-W-61-502128, JP-A-62-2231, and JP-A-64-62615 teach a process for preparing a liquid crystal element comprising a polymeric binder having dispersed therein liquid crystal droplets, comprising polymerizing a polymerizable composition comprising a polymerizable monomer (e.g., an epoxy compound) and a low-molecular weight liquid crystal material by ultraviolet light or heat application to cause phase separation. JP-A-2-55787 proposes to raise the proportion of the low-molecular weight liquid crystal material to be used in the above-mentioned photopolymerizable composition thereby to reduce a driving voltage. JP-A-63-43993 and JP-A-63-137211 propose to produce a liquid crystal element, in which liquid crystal droplets are maintained in a high-molecular weight material, by dissolving a low-molecular weight liquid crystal material and a high-molecular weight material in a common organic solvent, and then evaporating the organic solvent.

In this type of displays, since switching between "on" and "off" states is controlled by utilizing the phenomenon that the light transmitted changes its scattering state on application of voltage, provision of polarizing sheets, which have been inevitable in conventional TN and STN mode liquid crystal display elements, is unnecessary. Display devices using the hybrid type elements therefore realize brighter display than with the elements having polarizing sheets. Further, no orientation film being used, the steps involved therefor, such as printing, baking and rubbing of an orientation film, are unnecessary, which is expected to realize widening of the area of an element and to bring about reduction of cost.

However, since the conventional hybrid type display elements comprising a polymeric binder having supported therein a low-molecular weight liquid crystal compound need a high voltage of from several tens to 100 Vrms for driving the liquid crystal-polymer composite film, they have a narrow range of application. That is, they are difficult to apply to an active matrix display system using TFT or MIM, still less a time-sharing driving system, and have found use only as light controlling elements of simple structure (light controlling glass).

Further, they lack in steepness in the voltage-transmission curve and have no memory function, such as hysteresis characteristics, which disadvantages have made it virtually impossible to apply them to wide-area display elements.

Furthermore, they have insufficient heat resistance and readily undergo changes of the phase separation state with heat, resulting in changes of electro-optical characteristics.

In addition, the conventional liquid crystal-polymer composite film exhibits poor adhesion to a substrate, particularly a flexible substrate, such as a polyethylene terephthalate film. An attempt of providing an adhesive layer or using an adhesive may be effective to improve adhesion but causes deterioration of the electro-optical characteristics.

SUMMARY OF THE INVENTION

An object of the present invention is to provide a liquid crystal-polymer composite film which can be driven at a low voltage of not higher than 50 Vrms and exhibits a sufficient contrast, a rapid response, and excellent heat resistance, and is applicable as not only a light controlling element but a display element, an optical modulation element, an optical shutter, and a memory element.

Another object of the present invention is to provide a liquid crystal-polymer composite film which exhibits hysteresis characteristics and is therefore applicable to display elements of wider area.

A further object of the present invention is to provide a process for producing an electro-optical element using a liquid crystal-polymer composite film having the above-mentioned characteristics.

A still further object of the present invention is to provide an electro-optical element having improved adhesion between a liquid crystal-polymer composite film and a substrate.

A yet further object of the present invention is to provide a process for producing the above-mentioned electro-optical element with good adhesion between a liquid crystal-polymer composite film and a substrate without the aid of an adhesive or an adhesive layer.

Other objects and effects of the present invention will be apparent from the following description.

The present invention provides a liquid crystal-polymer composite film comprising (1) a high-molecular weight compound containing at least one kind of monomer units providing a side chain having a liquid crystal nature (hereinafter referred to as a liquid crystal monomer unit) and at least one kind of monomer units providing a side chain having no liquid crystal nature (hereinafter referred to as a non-liquid crystal monomer unit) and (2) a low-molecular weight liquid crystal, the high-molecular weight compound (1) and the low-molecular weight liquid crystal (2) being in separate phases, and the non-liquid crystal monomer unit being crosslinked.

In a preferred embodiment of the liquid crystal-polymer composite film of the present invention, at least one kind of the non-liquid crystal monomer units contains a reactive group capable of reacting with an isocyanate group, and the high-molecular weight compound (1) is crosslinked with a polyfunctional isocyanate compound.

The present invention also provides a process for producing an electro-optical element, the process comprising the steps of:

coating, on a substrate having an electrode (hereinafter referred to as an electrode substrate), a solution comprising a solvent dissolved therein (2) at least one low-molecular weight liquid crystal, (1) a high-molecular weight compound containing at least one kind of liquid crystal monomer units and at least one kind of non-liquid crystal monomer units containing a reactive group, and (3) a reactive compound;

adhering another electrode substrate to the coated layer; and subjecting the coated layer to crosslinking.

In a preferred embodiment of the above process according to the present invention, the reactive compound is a polyfunctional isocyanate compound, and the reactive group in the non-liquid crystal monomer units is a group capable of reacting a polyfunctional polyisocyanate compound.

The present invention furthermore provides an electro-optical element comprising a pair of electrode substrates having interposed therebetween a liquid crystal-polymer composite film comprising (2) a low-molecular weight liquid crystal and (1) a high-molecular weight compound in separate phases, the substrates each having a surface comprising a material having a reactive group on the side in contact with the composite film, the reactive group being chemically bonded to the high-molecular weight compound (1) in the composite film.

The present invention furthermore provides a process for producing an electro-optical element comprising a pair of electrode substrates having interposed therebetween a liquid crystal-polymer composite film comprising (2) a low-molecular weight liquid crystal and (1) a high-molecular weight compound in separate phases, the process comprising the steps of:

coating, on a substrate having a surface comprising a material having a reactive group, a solution comprising a solvent dissolved therein (2) a low-molecular weight liquid crystal and (1) a high-molecular weight compound containing at least one kind of reactive groups on the side chain thereof, or a solution comprising a solvent dissolved therein the low-molecular weight liquid crystal (2), the high-molecular weight compound (1), and (3) at least one reactive compound capable of reacting with both of the reactive group of the substrate and the reactive group of the high-molecular weight compound (1);

adhering another substrate having a surface comprising a material having a reactive group on the coated layer either during or after removal of the solvent; and chemically bonding the coated layer to the reactive group on the surface of each substrate.

The present invention furthermore provides a process for producing an electro-optical element comprising a pair of electrode substrates having interposed therebetween a liquid crystal-polymer composite film comprising (2) a low-molecular weight liquid crystal and (1) a high-molecular weight compound in separate phases, the process comprising the steps of:

filling a polymerizable composition containing (2) a low-molecular weight liquid crystal compound and at least one polymerizable compound into a gap between a pair of substrates each having an inner surface comprising a material having a reactive group; and causing polymerization of said polymerizable compound and reaction of the polymerizable compound with the reactive group present on the surface of each substrate to produce (1) a high-molecular weight compound chemically bonded to the reactive group.

DETAILED DESCRIPTION OF THE INVENTION

The liquid crystal-polymer composite film according to the present invention performs its function with the low-molecular weight liquid crystal and the high-molecular weight compound existing in separate phases. The liquid crystal may form individually dispersed droplets or a plurality of liquid crystal droplets may be agglomerated. Each liquid crystal droplet may have a spherical form or a polygonal form as in the case where the high-molecular weight compound form a thin wall. The liquid crystal may form a continuous phase.

The structure of phase separation can be varied according to the physical properties of the low-molecular weight liquid crystal and the high-molecular weight compound and/or a mixing ratio thereof. Examples of the structures are shown in FIGS. 1(A)–1(C).

FIG. 1-A shows a phase structure of liquid crystal-polymer composite film 3 in which high-molecular weight compound 2 is in excess over low-molecular weight liquid crystal 1, and low-molecular weight liquid crystal 1 is dispersed as fine droplets in high-molecular weight compound 2. FIG. 1-B shows a phase structure in which low-molecular weight liquid crystal 1 and high-molecular weight compound 2 are substantially equivalent in amount to form a sponge-like structure. FIG. 1-C illustrates a phase structure in which low-molecular weight liquid crystal 1 is in excess over high-molecular weight compound 2, and high-molecular weight compound 2 forms a fibrous structure.

Figure 1A:
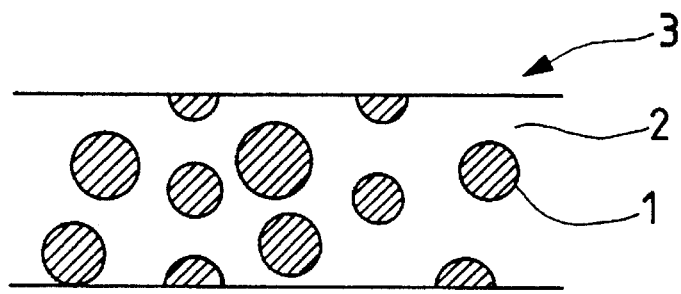
FIGS. 1(A)–1(C) schematically illustrates phase separation structures of the liquid crystal-polymer composite film according to the present invention.
Figure 1B:
Figure 1C:
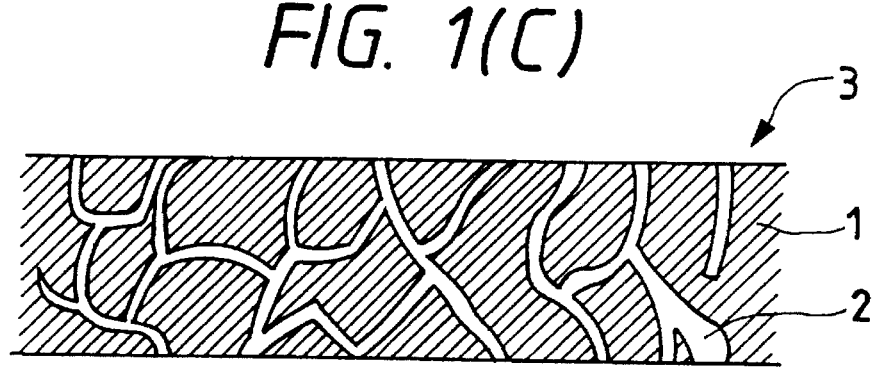

While the difference in phase structure as illustrated in FIGS. 1(A)–1(C) is due to the difference in mixing ratio of low-molecular weight liquid crystal 1 and high-molecular weight compound 2, the structure is also influenced by the physical properties of the components as described above.

Examples of the low-molecular weight liquid crystal which can be used in the present invention include various known liquid crystal materials used as an ordinary display material or an electric field-driven type display material, such as nematic liquid crystals, cholesteric liquid crystals, smectic liquid crystals, and ferroelectric liquid crystals. Specific examples of the liquid crystal material include biphenyl compounds, phenyl benzoate compounds, cyclohexylbenzene compounds, azoxybenzene compounds, azobenzene compounds, azomethine compounds, terphenyl compounds, biphenyl benzoate compounds, cyclohexylbiphenyl compounds, phenylpyrimidine compounds, cyclohexylpyrimidine compounds, and cholesterol compounds. These low-molecular weight liquid crystal materials may be used either individually or in combination of two or more thereof as usual with commonly employed liquid crystal materials.

Among the above-mentioned liquid crystal compounds, those showing positive dielectric anisotropy are preferred for particular application to electrical filed-driven displays. Some liquid crystals change their dielectric anisotropy from positive to negative with an increase of frequency of an applied voltage over a certain value called a cross-over frequency. Use of such liquid crystals makes it feasible to apply the resulting composite film to a bifrequency driving system.

The high-molecular weight compound which can be used in the present invention is a polymer comprising at least one liquid crystal monomer unit and at least one non-liquid crystal monomer unit, with the non-liquid crystal monomer unit being crosslinked. It is preferred that at least one kind of non-liquid crystal monomer units has a reactive group capable of reacting with an isocyanate group, and the reactive group is crosslinked by an isocyanate compound.

A homopolymer having a liquid crystal component in the side chain thereof called a side chain type liquid crystal polymer has been known in the art as an electro-optical material. The high-molecular weight compound used in the present invention includes a copolymer obtained by copolymerization of a composition containing at least one polymerizable monomer having a liquid crystal substituent (hereinafter referred to as a liquid crystal monomer) and at least one polymerizable monomer having no liquid crystal substituent (hereinafter referred to as a non-liquid crystal monomer) at a prescribed molar ratio. The high-molecular weight compound used in the present invention may not exhibit a liquid crystal nature by itself and, in this point, essentially differs from conventional side chain type liquid crystal polymers. Further, an addition product obtained by an addition reaction of a liquid crystal addition-reactive compound and a non-liquid crystal addition-reactive compound to a reactive prepolymer, such as a reactive silicone, can also be used as a high-molecular weight compound of the present invention. The details of the addition reaction are described, e.g., in *Makromol. Chem., Rapid Commun.*, Vol. 3, p. 557 (1982).

The above-mentioned liquid crystal monomer and liquid crystal addition-reactive compound may be compounds composed of a liquid crystal moiety bonded to a vinyl group, a (meth)acrylic ester group, etc. via an appropriate alkyl spacer, as described, e.g., in *Makromol. Chem.*, Vol. 179, p. 273 (1978), *Eur. Polym. J.*, Vol. 18, p. 651 (1982), and *Mol. Cryst. Liq. Crystal.*, Vol. 169, p. 167 (1989). Examples of such compounds include those composed of a residual group of various liquid crystal compounds, e.g., a biphenyl compound, a phenyl benzoate compound, a cyclohexylbenzene compound, an azoxybenzene compound, an azobenzene compound, an azomethine compound, a phenylpyrimidine compound, a diphenylacetylene compound, a biphenyl benzoate compound, a cyclohexylbiphenyl compound, a terphenyl compound or a cholesterol compound, bonded to a vinyl group, a (meth)acrylic ester group, etc. via an appropriate alkyl spacer. These liquid crystal monomers or addition-reactive compounds may be used either individually or in combination of two or more thereof. The term "(meth)acrylic" and the like used herein means "acrylic and methacrylic" and the like.

Preferred examples of the liquid crystal monomers and liquid crystal addition-reactive compounds include compounds represented by the following formulae:

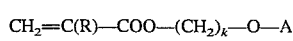

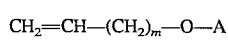

wherein R represents a hydrogen atom or a methyl group; k represents an integer of from 2 to 30; m represents an integer of from 1 to 20; and A represents a residual group of liquid crystal compound represented by the following structural formulae:

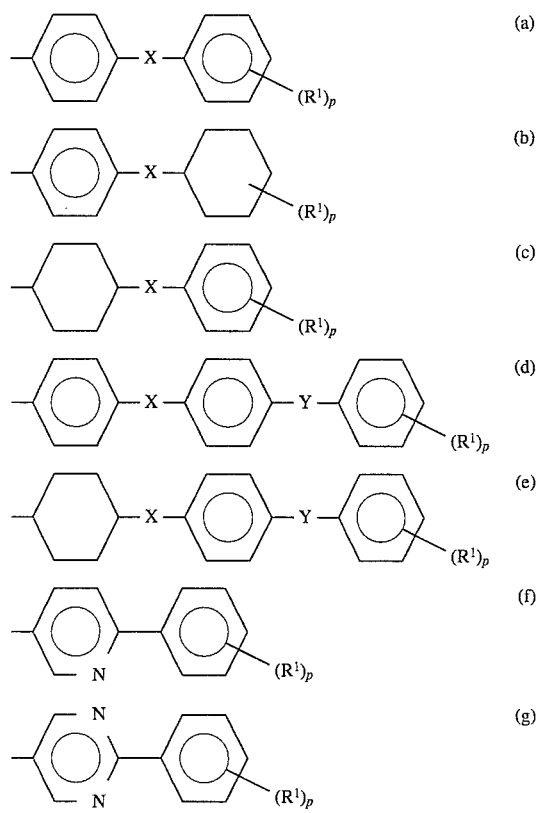

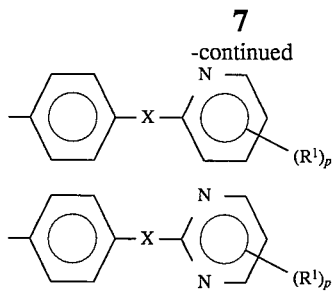

wherein X and Y each represent a single bond, —N=N—, —N(→O)=N—, —CH=N—, —N=CH—, —COO—, —O(C=O)— or an ethynylene group; $R^1$ represents an alkoxy group, a halogen atom, a cyano group, a carboxyl group or an alkyl group; and p represents an integer of from 1 to 5, provided that when p is 2 or greater, a plurality of groups $R^1$ may be the same or different.

The non-liquid crystal monomers which constitute the high-molecular weight compound are those having no liquid crystal nature and being copolymerizable with the above-described liquid crystal monomers. Specific examples of the non-liquid crystal monomers include a $C_{1-30}$ alkyl (meth)acrylate or a derivative thereof, a halogen-substituted alkyl (meth)acrylate, a dialkylaminoethyl (meth)acrylate, polyethylene glycol mono(meth)acrylate, (meth)acrylic acid, (meth)acrylamide, vinyl acetate, styrene or a derivative thereof, (meth)acrylonitrile, ethylene, vinyl chloride, vinylidene chloride, vinylidene fluoride, vinylpyrrolidone, butadiene, isoprene, and chloroprene. Among the above, a $C_{1-30}$ alkyl (meth)acrylate or a derivative thereof, a halogen-substituted alkyl (meth)acrylate, a dialkylaminoethyl (meth)acrylate, polyethylene glycol mono(meth)acrylate, and (meth)acrylic acid are preferred.

It is preferred to use a non-liquid crystal monomer or addition-reactive compound having a reactive group in combination with a reactive compound so as to obtain a high-molecular weight compound with its non-liquid crystal monomer unit being crosslinked.

In the case where the reactive group contains an active hydrogen, the reactive compound may be polyfunctional isocyanate compounds, polyfunctional epoxy compounds, polyfunctional propylene oxide compounds, polyfunctional ethylene sulfide compounds, polyfunctional propylene sulfide compounds, polyfunctional cyclooxabutane compounds, polyfunctional lactam compounds, polyfunctional lactone compounds, polyfunctional oxazolidine compounds, polyfunctional ethyleneimine compounds, polyfunctional propyleneimine compounds, polyfunctional aldehyde compounds, and melamine or derivatives thereof. It is particularly preferred to use a non-liquid crystal monomer or addition-reactive compound having a reactive group capable of reacting with an isocyanate group in combination with a polyfunctional isocyanate compound.

Examples of the non-liquid crystal monomer having a reactive group capable of reacting with an isocyanate group include 2-hydroxyethyl (meth)acrylate, 3-hydroxypropyl (meth)acrylate, glyceryl (meth)acrylate, vinylsulfonic acid, styrenesulfonic acid, and the above enumerated monomers having active hydrogen, e.g., (meth)acrylic acid and (meth)acrylamide.

It is also possible to use a copolymer having an isocyanate-reactive group which is obtained by hydrolyzing a copolymer containing a vinyl acetate monomer unit to convert the acetyl group thereof into a hydroxyl group.

Examples of the non-liquid crystal addition-reactive compounds include alkene derivatives, such as 1-propene, 1-butene, and 1-hexene. Examples of those having a reactive group capable of reacting an isocyanate group include 2-propen-1-ol and 5-hexen-1-ol.

The above-mentioned non-liquid crystal monomers or non-liquid crystal addition-reactive compounds may be used either individually or in combination of two or more thereof.

The high-molecular weight compound of the present invention can be prepared by general radical polymerization or ion polymerization of a polymerizable composition comprising at least one liquid crystal monomer and at least one non-liquid crystal monomer in the presence or absence of a polymerization initiator by heating or light irradiation. The addition reaction process can be carried out by adding the above-mentioned two kinds of addition-reactive compounds to a reactive prepolymer, e.g., hydrogenated polymethylsiloxane, in the presence of a catalyst, e.g., a platinum catalyst.

The high-molecular weight compound may have any known copolymerization form, such as a random copolymer, a block copolymer, and a graft copolymer. While not limiting, the high-molecular weight compound preferably has a molecular weight of from 10,000 to 1,000,000, and more preferably from 50,000 to 1,000,000.

The molar ratio of the liquid crystal monomer unit to the non-liquid crystal monomer unit in the high-molecular weight compound is generally in the range of from 0.1/100 to 100/1, preferably from 0.1/100 to 50/1, more preferably from 0.1/100 to 10/1, and most preferably from 0.1/100 to 5/1. With the liquid crystal monomer unit content exceeding the above range, the high-molecular weight compound tends to become compatible with the low-molecular weight liquid crystal molecules, resulting in reductions in display characteristics. With that content being too small, on the other hand, the activity of the liquid crystal side chain tends to be lessened. A high-molecular weight compound having the above-specified liquid crystal unit to non-liquid crystal unit molar ratio can be synthesized by starting from a polymerizable composition or addition-reactive composition in which a molar ratio of total liquid crystal monomer(s) or addition-reactive compound(s) and total non-liquid crystal monomer(s) or addition-reactive compound(s) is controlled to fall within the above-mentioned range.

The monomer unit having a reactive group is preferably used in an amount of from 1 to 100 mol %, more preferably from 5 to 50 mol %, based on the total non-liquid crystal monomer unit(s). If it is less than 1 mol %, the degree of crosslinking reached tends to be too low to obtain desired thermal characteristics, mechanical strength and electro-optical effects.

Examples of the polyfunctional isocyanate compound which reacts on the reactive group of the high-molecular weight compound to crosslink the non-liquid crystal monomer unit include those containing two or more isocyanate groups per molecule, such as bifunctional isocyanate compounds, e.g., hexamethylene diisocyanate, toluene diisocyanate, 4,4'-diphenylmethane diisocyanate, and 3,4-dichlorophenyl diisocyanate; and adducts of these bifunctional isocyanate compounds and a polyol, e.g., trimethylolpropane. Additionally, so-called blocked adducts capable of forming an isocyanate group at temperatures above a certain point may also be used.

The reactive compound, e.g., polyfunctional isocyanate compound, is preferably used in such an amount providing a reactive group in the reactive compound, e.g., an isocyanate group, in a substantially stoichiometrically equal molar ratio to the reactive group in the high-molecular weight compound, but an excess amount of the reactive group in the reactive compound or an excess amount of the reactive compound in the high-molecular weight compound may be possible.

Preparation of an electro-optical element using the above-mentioned liquid crystal-polymer composite film is explained below.

The element is preferably composed of a pair of electrode substrates and a liquid crystal-polymer composite film interposed therebetween. An element of this type is preferably produced by a process comprising preparing a mixed solution of the above-described low-molecular weight liquid crystal, high-molecular weight compound, and reactive compound, e.g., polyfunctional isocyanate compound, at a prescribed ratio in a common solvent, coating the resulting mixed solution on an electrode substrate to a uniform thickness, removing the solvent, adhering another electrode substrate on the coated layer, and crosslinking the high-molecular weight compound under, if desired, heating. While not limiting, the solvent to be used for the preparation of the mixed solution is preferably those inert to the reactive group, such as an aprotic solvent inert to an isocyanate group. If desired, an appropriate spacer, such as glass beads, resin particles, alumina particles, glass fibers, and films, may be employed to regulate the coating thickness of the composite film.

The thickness of the liquid crystal-polymer composite film according to the present invention is generally from 0.1 to 100 μm, and preferably from 1 to 50 μm.

If desired, a protective layer or an adhesive layer may be provided between the electrode substrate and the composite film. Further, a surface layer comprising a material having a reactive group may be provided on an electrode substrate as in the embodiment hereinafter described.

While the low-molecular weight liquid crystal content in the composite film is subject to variation according to the desired performance properties, a preferred weight ratio of the low-molecular weight liquid crystal to the high-molecular weight compound inclusive of the reactive compound, e.g., a polyfunctional isocyanate compound, is in the range of from 1/10 to 50/1. If the low-molecular weight liquid crystal content exceeds this range, it tends to be difficult to obtain a composite film with satisfactory electro-optical characteristics, sufficient shape retention or mechanical strength. If it is lower than the range, desired electro-optical characteristics tend to be hard to obtain. A preferred weight ratio is from 1/5 to 20/1, and more preferably from 1/1 to 9/1.

The liquid crystal-polymer composite film according to the present invention is applicable as such to display elements and memory elements. If desired, various compounds can be added for improving contrast, stability, and durability. For example, improvement in contrast can be achieved by addition of dichroic dyes, such as anthraquinone dyes, styryl dyes, azomethine dyes, and azo dyes. It is preferable that the dichroic dye should be compatible with the liquid crystal components while incompatible with the high-molecular weight compound in the composite film. Further, antioxidants, ultraviolet absorbents, and various plasticizers may also be added for improving stability or durability.

Figure 2:
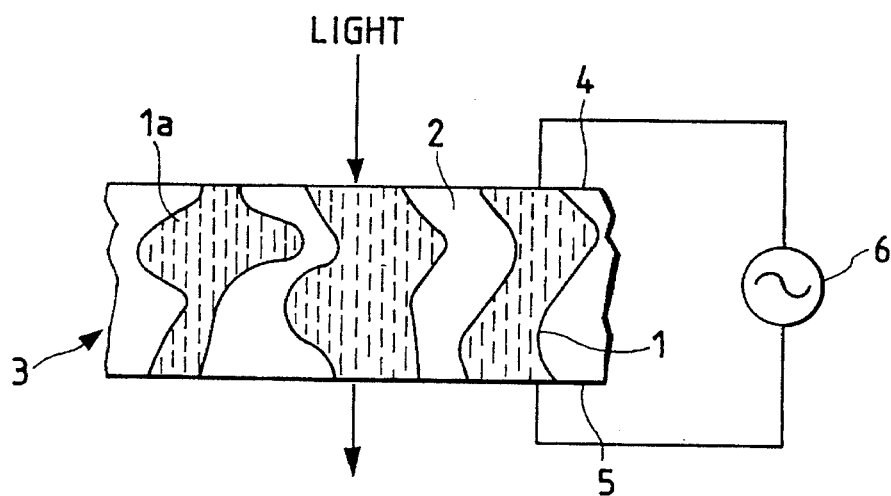
FIG. 2 is a diagram of the device using the liquid crystal-polymer composite film according to the present invention.

Devices using the composite film of the present invention preferably have a structure commonly employed in general liquid crystal elements in which the film is sandwiched in between a pair of electrode substrates 4 and 5 as shown in FIG. 2. In the particular state shown in FIG. 2, a voltage supplied from power source 6 is applied to electrode substrates 4 and 5 to orient low-molecular weight liquid crystal molecules 1 in the direction of the electric field. In this state, incident light indicated by the arrow transmits composite film 3 without being scattered.

Examples of the electrode substrate include transparent conductive glass plates, such as glass plates having an indium-tin oxide (ITO) layer or an oxide layer, and conductive polyester films, such as a polyethylene terephthalate film having an ITO layer. An aluminum-deposited film, a gold-deposited film, a silver-deposited film, an aluminum plate, a copper plate, etc. may be used as one of the two electrode plates.

Figure 3A:
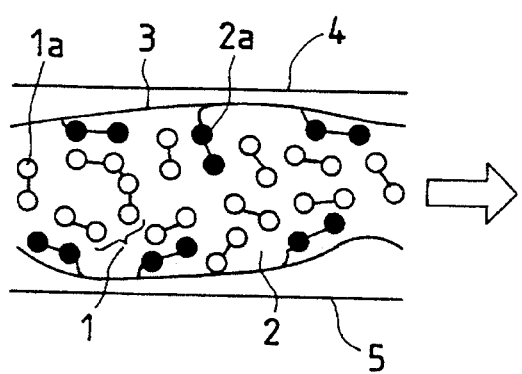
FIGS. 3(A)–3(B) illustrates the working mechanism of the liquid crystal-polymer composite film according to the present invention.
Figure 3B:
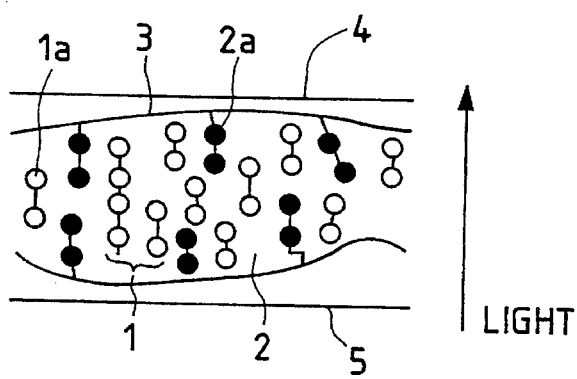

The following assumption is presented to account for the working mechanism of the liquid crystal-polymer composite film according to the present invention with reference to FIGS. 3(A)–3(B). In FIG. 3-A where no voltage is applied to electrode substrates 4 and 5, low-molecular weight liquid crystal 1 is dispersed and supported in the composite film in a separated phase, and liquid crystal molecule 1a is oriented along the wall of high-molecular weight compound 2 to cause irregular reflection of incident light, making the film white turbid. In this state, because liquid crystal side chain component 2a having a liquid crystal monomer unit in high-molecular weight compound 2 has high affinity to low-molecular weight liquid crystal molecule 1a, liquid crystal side chain component 2a and low-molecular weight liquid crystal molecule 1a are compatible with each other on the interface therebetween to form a domain of the latter as if it is surrounded by the interface of the former. When a voltage is applied to the film to generate an electrical field, low-molecular weight liquid crystal molecule 1a is oriented along the direction of the electrical field, and the composite film transmits incident light to turn to transparent as shown in FIG. 3-B. It is considered that in this state liquid crystal side chain component 2a at the interface is also oriented in the same direction as liquid crystal molecule 1a or in the vertical direction to lessen its anchoring effect on the low-molecular weight liquid crystal molecules at the interface so that switching between "on" and "off" states can be achieved at a low applied voltage.

The liquid crystal side chain component having a liquid crystal monomer unit may be arrayed on the interface between the low-molecular weight liquid crystal phase and the high-molecular weight compound phase because of its high affinity to the low-molecular weight liquid crystal. It would follow that the force of anchoring the low-molecular weight liquid crystal molecules to the interface of the high-molecular weight compound is reduced thereby making it possible to drive the element with a reduced power.

Where a liquid crystal side chain component which is oriented at a higher voltage than that required for orientation of the low-molecular weight liquid crystal is used, the orientation of the low-molecular weight liquid crystal is virtually governed by the interface of the liquid crystal side chain component. As a result, the low-molecular weight liquid crystal manifests memory effects and hysteresis characteristics as observed with high-molecular weight liquid crystals. Thus, the composite film of the present invention accomplishes the objects of low voltage driving properties and memory properties which could not be achieved by the conventional liquid crystal-polymer composite films.

Furthermore, where the high-molecular weight compound is crosslinked by addition of a reactive compound, such as a polyfunctional isocyanate compound, there are produced many advantages, such as an improvement in adhesion between the composite film and each electrode substrate, an improvement in mechanical strength of the composite film, easy control of the compatibility between the high-molecular weight compound and the low-molecular weight liquid crystal, an improvement in stability against a temperature rise, an improvement in heat resistance, and improvements in various electro-optical characteristics.

An embodiment in which an electrode substrate whose surface is made of a material having a reactive group is hereinafter explained.

The reactive group of the material constituting the surface of a substrate includes those having active hydrogen, such as a hydroxyl group, a carboxyl group, an amino group, an acid amide group, and a mercapto group; an alkali metal alcoholate group, a magnesium halide group, an epoxy group, a propylene oxide group, an ethylene sulfide group, a propylene sulfide group, a cyclohexabutane group, a lactam group, a lactone group, an oxazolidine group, an ethyleneimine group, a propyleneimine group, an isocyanate group; and polymerizable groups, such as an unsaturated double bond.

The reactive group can be introduced into the surface of an electrode substrate by, for example, a surface treatment, such as heating of a substrate in active hydrogen or a steam atmosphere in a high temperature or a plasma surface treatment to form a reactive group such as a hydroxyl group on the substrate surface, a method of coating a polymeric compound having a reactive group on the substrate surface, a method of adsorption or coating of a low-molecular compound containing a reactive group on the substrate surface.

Examples of the polymeric compound containing a reactive group includes those containing a hydroxyl group, e.g., polyvinyl alcohol and polyvinyl butyral, and those containing an amino group or an amide group, e.g., polyallylamine, polyurethane, and polyamide. High-molecular weight compounds having various reactive groups which can be used in the preparation of a liquid crystal-polymer composite film hereinafter described may also be used for preference.

Examples of the low-molecular compound containing a reactive group includes silane coupling agents containing an amino group, a carboxyl group, a (meth)acrylic acid group or a vinyl group.

Introduction of a reactive group into a substrate surface may also be effected by adsorption or coating of a silane coupling agent containing a halogen atom or a vinyl group on a substrate followed by hydrolysis to convert the active atom or group into a hydroxyl group.

The reactive group-containing surface layer on a substrate preferably has a thickness of a monomolecular layer up to 1 µm for the layers formed by adsorption, and from 1 nm to 10 µm for the layers formed by coating.

On the thus formed surface layer of a substrate is formed a liquid crystal-polymer composite film. The high-molecular weight compounds constituting the composite film according to this embodiment include (a) those containing at least one kind of a reactive group on the side chain thereof, (b) those formed from the above-mentioned high-molecular weight compound (a) and at least one compound capable of reacting therewith, and (c) those formed from at least one polymerizable compound. In any case, the high-molecular weight compound in the composite film is chemically bonded to the reactive group on the substrate surface.

The high-molecular weight compound may be formed by (I) previously preparing a high-molecular weight compound having a reactive group on the side chain thereof from a polymerizable compound or (II) polymerizing a polymerizable compound in situ on the surface of a substrate.

Where process (I) is followed, the reactive group in the high-molecular weight compound which is to be chemically bonded to the reactive group on the substrate surface may be selected from an amino group, a carboxyl group, an alkali metal alcoholate group, a magnesium halide group, etc. includes an epoxy group, a propylene oxide group, an ethylene sulfide group, an oxazolidine group, an ethyleneimine group, a propyleneimine group, and a combination thereof. The above-enumerated reactive group on the substrate surface may also be present in the high-molecular weight compound, and the above-enumerated reactive group in the high-molecular weight compound may also be the reactive group to be formed on the substrate surface.

In process (I), where a third reactive compound is added in addition to the high-molecular weight compound and a low-molecular weight liquid crystal as hereinafter described, the reactive group on the substrate surface and that in the high-molecular weight compound are preferably of the same kind.

The above-mentioned high-molecular weight compound according to process (I) is prepared by (I-1) polymerization of a reactive group-containing polymerizable monomer or (I-2) addition reaction of a reactive group-containing addition-reactive compound to a reactive prepolymer, such as hydrogenated polymethylsiloxane.

According to process (I-1) (polymerization process), a monomer composition containing at least a polymerizable monomer containing a reactive group is subjected to radical polymerization, ion polymerization or photopolymerization in a usual manner. In this case, the resulting high-molecular weight compound may be either a homopolymer of the reactive group-containing polymerizable monomer or a copolymer of the reactive group-containing monomer and other polymerizable monomers containing no reactive group.

Specific examples of the polymerizable monomer include a $C_{1-30}$ alkyl (meth)acrylate or a derivative thereof, a halogen-substituted alkyl (meth)acrylate, a dialkylaminoethyl (meth)acrylate, a polyethylene glycol mono(meth)acrylate, (meth)acrylic acid, (meth)acrylamide, vinyl acetate, styrene or a derivative thereof, (meth)acrylonitrile, ethylene, vinyl chloride, vinylidene chloride, vinylidene fluoride, vinylpyrrolidone, butadiene, isoprene, and chloroprene. Among the above, a $C_{1-30}$ alkyl (meth)acrylate or a derivative thereof, a halogen-substituted alkyl (meth)acrylate, a dialkylaminoethyl (meth)acrylate, a polyethylene glycol mono(meth)acrylate, and (meth)acrylic acid are preferred.

Specific examples of polymerizable monomers having an epoxy group as a reactive group include glycidyl (meth)acrylate and glycidyl vinylbenzoate. Specific examples of polymerizable monomers having active hydrogen as a reactive group include 2-hydroxyethyl (meth)acrylate, 3-hydroxypropyl (meth)acrylate, glyceryl (meth)acrylate, vinylsulfonic acid, styrenesulfonic acid, and the above enumerated monomers having active hydrogen, e.g., (meth)acrylic acid and (meth)acrylamide. It is also possible to use a high-molecular weight compound having a reactive group which is obtained by hydrolyzing a copolymer containing a vinyl acetate monomer unit to convert the acetyl group thereof into a hydroxyl group.

The high-molecular weight compound is preferably prepared by copolymerizing a liquid crystal monomer. In this case, the resulting high-molecular weight compound may not exhibit a liquid crystal nature by itself, essentially differing from a conventional side chain type polymeric liquid crystals. Existence of a liquid crystal monomer unit in the high-molecular weight compound is expected to markedly reduce the anchoring effect between a low-molecular weight liquid crystal and a polymeric binder wall thereby realizing low voltage driving.

The above-mentioned liquid crystal monomer is a compound composed of a liquid crystal moiety bonded to a vinyl group, a (meth)acrylic group, etc. via an appropriate alkyl spacer, as described, e.g., in *Makromol. Chem.*, Vol. 179, p. 273 (1978), *Eur. Polym. J.*, Vol. 18, p. 651 (1982), and *Mol. Cryst. Liq. Crystal.*, Vol. 169, p. 167 (1989). Examples of such compounds include those composed of a liquid crystal residual group of, e.g., a biphenyl compound, a phenyl benzoate compound, a cyclohexylbenzene compound, an azoxybenzene compound, an azobenzene compound, an azomethine compound, a phenylpyrimidine compound, a diphenylacetylene compound, a biphenyl benzoate compound, a cyclohexylbiphenyl compound, a terphenyl compound or a cholesterol compound, bonded to a vinyl group, a (meth)acrylic ester group, etc. via an appropriate alkyl spacer. These liquid crystal monomers may be used either individually or in combination of two or more thereof.

Process (I-2) (addition reaction process) can generally be carried out by adding an addition-reactive compound having an unsaturated double bond to a reactive prepolymer, e.g., a hydrogenated polymethylsiloxane, in the presence of a catalyst, e.g., a platinum catalyst. Examples of the addition-reactive compounds include alkene derivatives, such as 1-propene, 1-butene, and 1-hexene. Examples of those having a reactive group include alkenyl alcohol derivatives, such as 2-propen-1-ol and 5-hexen-1-ol.

While not limiting, the high-molecular weight compound has a molecular weight of from 10,000 to 1,000,000, and preferably from 50,000 to 1,000,000.

If desired, the above-mentioned high-molecular weight compound having a reactive group in the side chain thereof may be used in combination with a reactive compound, as a third component, capable of reacting with both the reactive group present on the substrate surface and the reactive group present in the side chain of the high-molecular weight compound. Any of reactive compounds capable of reacting with the above-described reactive groups may be used. For example, where the reactive group on the substrate surface and that on the high-molecular weight compound have active hydrogen, the third component to be used is selected from polyfunctional isocyanate compounds, polyfunctional epoxy compounds, polyfunctional propylene oxide compounds, polyfunctional ethylene sulfide compounds, polyfunctional propylene sulfide compounds, polyfunctional cyclooxabutane compounds, polyfunctional lactam compounds, polyfunctional lactone compounds, polyfunctional oxazolidine compounds, polyfunctional ethyleneimine compounds, polyfunctional propyleneimine compounds, polyfunctional aldehyde compounds, and melamine or derivatives thereof. Preferred examples of the combination of the reactive compound and the reactive group include the combination of an amine or acid compound and an epoxy group and the combination of an isocyanate compound and a group containing active hydrogen, e.g., —OH, —NH$_2$, and —COOH.

Of the above-recited compounds, particularly preferred are polyfunctional isocyanate compounds because of their high reactivity. Specific examples of the polyfunctional isocyanate compounds include bifunctional isocyanate compounds, e.g., hexamethylene diisocyanate, toluene diisocyanate, 4,4'-diphenylmethane diisocyanate, and 3,4-dichlorophenyl diisocyanate; and adducts of these bifunctional isocyanate compounds and a polyol, e.g., trimethylolpropane. Additionally, so-called blocked isocyanate compounds capable of forming an isocyanate group at temperatures above a certain point are also employable. Specific examples of polyfunctional epoxy compounds are bisphenol A glycidyl ether and derivatives thereof.

In the case where the reactive group on a substrate surface and that in a high molecular weight compound are both an epoxy group, a monofunctional or polyfunctional amino compound or a carboxylic acid compound is preferably used as a reactive compound.

The reactive compound as a third component is preferably added in a substantially stoichiometrically equal amount to the reactive groups on the substrate surface and the high-molecular weight compound, but an excess amount of one of them may be possible. Addition of the third component induces not only chemical bonding between the substrate surface and the polymer in the composite film but also crosslinking of the polymer thereby to improve the strength and electro-optical characteristics of the composite film.

Where the high-molecular weight compound is prepared by process (II) (in situ polymerization), the manner of polymerization and the polymerizable monomers are the same as those described for process (I). In this case, however, because a high-molecular weight compound is prepared from a solution comprising a liquid crystal and a polymerizable monomer, it is necessary to choose a polymerizable monomer having compatibility with a liquid crystal. That is, the polymerizable monomer to be used in process (II) should be selected appropriately according to the kind of the liquid crystal to be combined with.

The low-molecular weight liquid crystal which can be used in this embodiment of the present invention include various known liquid crystal compounds used as a general display material or an electric field-driven type display material, such as nematic liquid crystals, cholesteric liquid crystals, smectic liquid crystals, and ferroelectric liquid crystals. Specific examples of the liquid crystal material include biphenyl compounds, phenyl benzoate compounds, cyclohexylbenzene compounds, azoxybenzene compounds, azobenzene compounds, azomethine compounds, terphenyl compounds, biphenyl benzoate compounds, cyclohexylbiphenyl compounds, phenylpyrimidine compounds, cyclohexylpyrimidine compounds, and cholesterol compounds. These low-molecular weight liquid crystal materials may be used either individually or in combination of two or more thereof as usual with commonly employed liquid crystal materials.

Among the above-mentioned liquid crystal compounds, those showing positive dielectric anisotropy are preferred for particular application to electrical filed-driven displays. Some liquid crystals change their dielectric anisotropy from positive to negative with an increase of frequency of an applied voltage over a certain value called a cross-over frequency. Use of such liquid crystals makes it feasible to apply the resulting composite film to a bifrequency driving system.

While the low-molecular weight liquid crystal content in the composite film is subject to variation according to the desired performance properties, a preferred weight ratio of the low-molecular weight liquid crystal to the high-molecular weight compound inclusive of the reactive compound, e.g., a polyfunctional isocyanate compound, is in the range of from 1/10 to 50/1. If the low-molecular weight liquid crystal content exceeds this range, it tends to be difficult to obtain a composite film with satisfactory electro-optical characteristics, sufficient shape retention or mechanical strength. If it is lower than the range, desired electro-optical characteristics tend to be hard to obtain. A preferred weight ratio is from 1/5 to 20/1, and more preferably from 1/1 to 9/1.

Production of an electro-optical element using the above-mentioned substrates each having a reactive group on the surface thereof and the above-mentioned liquid crystal-polymer composite film is explained below. The term "electrode substrate" or simply "substrate" hereinafter appearing with respect to the production of an electro-optical elements means the specific electrode substrate whose surface is made of a material having a reactive group, except where noted.

Where the liquid crystal-polymer composite film is prepared by using a previously synthesized high-molecular weight compound having a reactive group on the side chain thereof according to process (I), a low-molecular weight liquid crystal, the high-molecular weight compound and, if desired, a reactive compound as a third component are dissolved in a common solvent to prepare a mixed solution, and the solution is coated on an electrode substrate. After drying, another electrode substrate is adhered on the coated layer to obtain an element composed of a pair of electrode substrates having a composite film therebetween.

Where the composite film is prepared by in situ polymerization according to process (II), a low-molecular weight liquid crystal, a polymerizable composition, and a polymerization initiator are mixed to prepare a uniform solution. The solution is filled into a cell composed of a pair of electrode substrates with a given gap therebetween, or the solution is coated on one of the substrates and the other substrate is superposed thereon with a given gap. The polymerizable composition in the cell is then polymerized by heat or light to prepare an element composed of a pair of substrates having a composite film therebetween. In this case, a reactive group having an unsaturated double bond, such as a (meth)acrylic acid group or a vinyl group, is formed on the surface of each substrate.

Devices according to this embodiment of the present invention also preferably have a structure commonly employed in general liquid crystal elements in which the film is sandwiched in between a pair of electrode substrates 4 and 5 as shown in FIG. 2. FIG. 2 shows a particular state in which a voltage supplied from power source 6 is applied to electrode substrates 4 and 5 to orient low-molecular weight liquid crystal molecules 1 in the direction of the electric field.

Examples of the electrode substrate used in this embodiment of the present invention include transparent substrates, such as a glass plate or plastic film having thereon an ITO layer, an aluminum-deposited film, a gold-deposited film, a silver-deposited film, a copper-plated film, etc. An appropriate spacer may be used to provide a uniform electrode distance as is usual in conventional techniques.

The liquid crystal-polymer composite film according to the present invention is applicable as such to display elements. If desired, various compounds can be added for improving contrast, stability, and durability. For example, improvement in contrast can be achieved by addition of dichroic dyes, such as anthraquinone dyes, styryl dyes, azomethine dyes, and azo dyes. It is preferable that the dichroic dye should be basically compatible with the liquid crystal components while incompatible with the high-molecular weight compound in the composite film. Further, antioxidants, ultraviolet absorbents, and various plasticizers may also be added for improving stability or durability.

According to the aforesaid embodiment using a pair of substrates each having a reactive group on the surface thereof, since the substrate supporting the liquid polymer composite film and the high-molecular weight compound constituting the composite film are chemically bonded to each other through direct reaction, high adhesive strength can be assured between the substrate and the composite film. Therefore, even if in using a flexible material as a substrate, there is obtained an element with high strength.

The present invention will now be illustrated in greater detail with reference to Examples, but it should be understood that the present invention is not deemed to be limited thereto.

The weight average molecular weight of the polymers prepared in Examples was measured by gel-permeation chromatography (GPC) and reduced to polystyrene.

EXAMPLE 1

A monomer mixture consisting of 0.5 g of a liquid crystal monomer represented by formula (1) shown below, 0.5 g of 2-hydroxyethyl methacrylate, and 9.0 g of ethyl methacrylate was copolymerized by using 2,'2-azobisisobutyronitrile (hereinafter abbreviated as AIBN) as a polymerization initiator. The resulting high-molecular weight compound (copolymer) had a weight average molecular weight of about 300,000. NMR analysis revealed that the composition of the copolymer was substantially the same as the charged composition. The polymer showed no liquid crystal nature when observed under a polarizing microscope.

Liquid Crystal Monomer

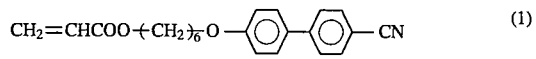
(1)

200 mg of the resulting copolymer, 200 mg of a low-molecular wight liquid crystal ("E-44" produced by BDH Co.), and 15 mg of a hexamethylene diisocyanate-trimethylolpropane adduct ("Coronate HX" produced by Nippon Polyurethane Co., Ltd.) as a polyfunctional isocyanate compound were dissolved in toluene, and the resulting solution was coated on a transparent conductive substrate with a blade coater and dried. An ITO-coated polyethylene terephthalate (hereinafter abbreviated as PET) film was adhered to the coated layer, and the coated layer was subjected to crosslinking to form a liquid crystal-polymer composite film having a thickness of about 10 μm. The composite film appeared uniformly white turbid to the naked eye. Observation of the film under a polarizing microscope revealed fine separate domains of the low-molecular weight liquid crystal.

EXAMPLE 2

A monomer mixture consisting of 1.0 g of a liquid crystal monomer represented by formula (2) shown below, 1.0 g of 2-hydroxyethyl methacrylate, and 8.0 g of methyl methacrylate was copolymerized by using AIBN as a polymerization initiator. The resulting copolymer had a weight average molecular weight of about 400,000. NMR analysis revealed that the composition of the resulting copolymer was substantially the same as the charged composition. The polymer showed no liquid crystal nature when observed under a polarizing microscope.

Liquid Crystal Monomer

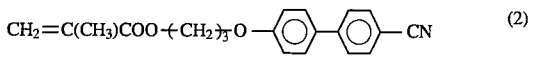
(2)

200 mg of the resulting copolymer, 200 mg of a low-molecular wight liquid crystal "E-44", and 30 mg of a polyfunctional isocyanate compound "Coronate HX" were dissolved in toluene, and the resulting solution was coated on a transparent conductive substrate with a blade coater and dried. An ITO-coated PET film was adhered to the coated layer, and the coated layer was subjected to crosslinking to form a composite film having a thickness of about 10 μm. The resulting composite film appeared uniformly white turbid to the naked eye. Observation of the film under a polarizing microscope revealed fine separate domains of the low-molecular weight liquid crystal.

EXAMPLE 3

A monomer mixture consisting of 1.0 g of a liquid crystal monomer represented by formula (3) shown below, 0.5 g of acrylic acid, and 8.5 g of methyl methacrylate was copolymerized by using AIBN as a polymerization initiator. The resulting copolymer had a weight average molecular weight of about 350,000. NMR analysis revealed that the composition of the resulting copolymer was substantially the same as the charged composition. The copolymer showed no liquid crystal nature when observed under a polarizing microscope.

Liquid Crystal Monomer

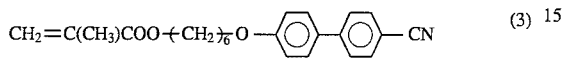 (3)

200 mg of the resulting copolymer, 800 mg of a low-molecular wight liquid crystal "E-44", and 30 mg of a polyfunctional isocyanate compound "Coronate HX" were dissolved in toluene, and the resulting solution was coated on a transparent conductive substrate with a blade coater and dried. An ITO-coated PET film was adhered to the coated layer, and the coated layer was subjected to crosslinking to form a composite film having a thickness of about 10 μm. The composite film appeared uniformly white turbid to the naked eye. Observation of the film under a polarizing microscope revealed fine separate domains of the low-molecular weight liquid crystal.

COMPARATIVE EXAMPLE 1

A liquid crystal-polymer composite film was prepared in the same manner as in Example 1, except for using a homopolymer of ethyl methacrylate in place of the copolymer and using no isocyanate compound.

COMPARATIVE EXAMPLE 2

A monomer mixture consisting of 0.5 g of a liquid crystal monomer of formula (1) and 9.5 g of ethyl methacrylate was copolymerized in the presence of AIBN in the same manner as in Example 1.

A liquid crystal-polymer composite film was prepared in the same manner as in Example 1, except for using the prepared copolymer in place of the copolymer used in Example 1 and using no isocyanate compound.

Evaluation

The samples obtained in Examples 1 to 3 exhibited sufficient adhesion between the transparent conductive substrate and the PET film for functioning as a cell as they were. To the contrary, the samples obtained in Comparative Examples 1 and 2 showed poor adhesion and could not function without the aid of an adhesive.

Voltage-transmission characteristics of the samples were examined as follows.

Figure 4:
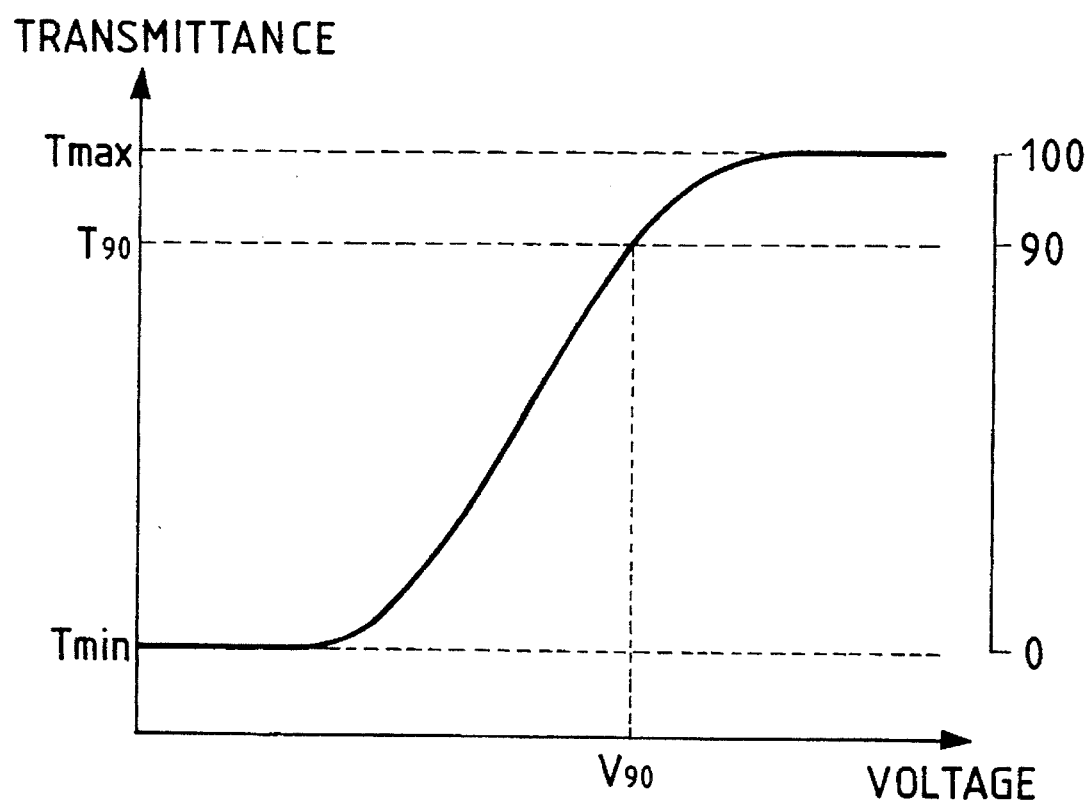
FIG. 4 is a voltage-transmission curve of a liquid crystal-polymer composite film.

White light emitted from a 50 W halogen lamp was made into parallel rays through an optical system and then transmitted through a cell sample. At the same time, an alternating voltage of square wave (100 Hz) was applied to the cell. The intensity of the transmitted light at a viewing angle of ±10° was read out for every rise in voltage applied to prepare a voltage-transmission curve (V-T curve). A driving voltage $V_{90}$ at which the percent transmission reaches 90% of the total change in transmission (a difference between $T_{max}$ and $T_{min}$ in FIG. 4) and a contrast CR ($T_{max}/T_{min}$) were obtained from the V-T curve. The measurements were made on a sample kept at temperature of 30° C. (measurement 1) and a sample having been once kept at 100° C. for 1 minute followed by cooling to 30° C. (measurement 2). The results obtained are shown in Table 1 below.

TABLE 1

| Example No. | Measurement 1 | | Measurement 2 | |
|---|---|---|---|---|
| | $V_{90}$ (Vrms) | CR | $V_{90}$ (Vrms) | CR |
| Example 1 | 16.5 | 23 | 16.5 | 23 |
| Example 2 | 12.5 | 25 | 12.6 | 25 |
| Example 3 | 6.0 | 25 | 6.0 | 25 |
| Comparative Example 1 | 60.7 | 12 | 57.0 | 7 |
| Comparative Example 2 | 18.5 | 18 | 17.8 | 9 |

It is seen from the results in Table 1 that the samples according to the present invention can be driven at a lower voltage and exhibit a higher contrast as compared with the comparative samples. Further, the samples according to the present invention show no change in electro-optical characteristics depending on the thermal history, whereas the comparative samples obviously suffer from a reduction in contrast on being heated, indicating inferiority in heat resistance. From the results of Example 1 in view of those of Comparative Example 2 it is seen that the liquid crystal-polymer composite film of the present invention has improved heat stability, indicating obvious superiority of the composite film of the invention.

EXAMPLE 4

Preparation of Coated Substrate

A pair of ITO-coated PET films Were each coated with polyvinyl alcohol with a blade coater and dried to form a surface layer having a thickness of about 0.5 μm.

Preparation of High-Molecular Weight Compound

A monomer mixture consisting of 0.5 g of 2-hydroxyethyl methacrylate and 9.5 g of ethyl methacrylate was copolymerized by using AIBN as a polymerization initiator. The resulting high-molecular weight compound (copolymer) had a weight average molecular weight of about 300,000. NMR analysis revealed that the composition of the resulting copolymer was substantially the same as the charged composition.

Preparation of Composite Film 200 mg of the resulting copolymer, 200 mg of a low-molecular weight liquid crystal "E-44", and 15 mg of a polyfunctional isocyanate compound "Coronate HX" were dissolved in toluene, and the resulting solution was coated on one of the above-prepared coated substrates to a dry thickness of about 10 μm with a blade coater and dried. The other coated substrate was adhered to the coated layer, and the coated layer was subjected to a reaction at 50° C. for 24 hours to form a liquid crystal-polymer composite film. The composite film appeared uniformly white turbid to the naked eye. Observation of the film under a polarizing microscope revealed fine separate domains of the low-molecular weight liquid crystal.

EXAMPLE 5

Preparation of Coated Substrate

A pair of ITO-coated PET films were each coated with aminopropyltriethoxysilane with a blade coater and dried in a nitrogen atmosphere to form a surface layer having a thickness of about 0.1 μm.

Preparation of High-Molecular Weight Compound

A monomer mixture consisting of 0.5 g of glycidyl methacrylate and 9.5 g of ethyl methacrylate was copolymerized by using AIBN as a polymerization initiator. The resulting copolymer had a weight average molecular weight of about 300,000. NMR analysis revealed that the composition of the resulting copolymer was substantially the same as the charged composition.

Preparation of Composite Film 200 mg of the resulting copolymer, 200 mg of a low-molecular wight liquid crystal "E-44", and 10 mg of hexamethylenediamine as a polyfunctional amino compound were dissolved in toluene, and the resulting solution was coated on one of the above-prepared coated substrates to a dry thickness of about 10 μm with a blade coater and dried. The other coated substrate was adhered to the coated layer, and the coated layer was subjected to a reaction at 60° C. for 24 hours to form a liquid crystal-polymer composite film. The composite film appeared uniformly white turbid to the naked eye. Observation of the film under a polarizing microscope revealed fine separate domains of the low-molecular weight liquid crystal.

COMPARATIVE EXAMPLE 3

A liquid crystal-polymer composite film was prepared in the same manner as in Example 4, except for replacing the coated substrate with an ITO-coated PET film having no surface layer and adding no polyfunctional isocyanate compound.

COMPARATIVE EXAMPLE 4

A liquid crystal-polymer composite film was prepared in the same manner as in Example 5, except for replacing the coated substrate with an ITO-coated PET film having no surface layer and adding no polyfunctional amino compound.

COMPARATIVE EXAMPLE 5

A liquid crystal-polymer composite film was prepared in the same manner as in Example 4, except for replacing the coated substrates with a pair of ITO-coated PET films each having adhered thereon a double-sided adhesive tape (a product of Sumitomo 3M; thickness: 25 μm) and adding no polyfunctional isocyanate compound.

Evaluation

Each of the samples as obtained in Examples 4 and 5 and Comparative Examples 3 to 5 was evaluated in the same manner as in Example 1 to determine $V_{90}$ and CR.

Further, each sample was cut to a size of 1 cm×1 cm. One of the substrates was fixed, and a spring balance was fitted to the end of the other substrate and pulled to measure a tensile strength.

The results obtained are shown in Table 2 below.

TABLE 2

| Example No. | Tensile Strength (gf) | $V_{90}$ (Vrms) | CR |
| --- | --- | --- | --- |
| Example 4 | 1,100 | 26.3 | 19 |
| Example 5 | 1,050 | 29.9 | 20 |
| Comparative Example 3 | 10 | 60.7 | 12 |
| Comparative Example 4 | 15 | 63.9 | 10 |
| Comparative Example 5 | 200 | 95.1 | 13 |

It is seen from Table 2 that the samples according to the present invention exhibit markedly improved adhesion between a substrate and a composite film as compared with the comparative samples. Further, the sample of Comparative Example 5 having an adhesive layer between each substrate and the composite film apparently suffered from deterioration in electro-optical characteristics, while the samples of the present invention undergo no such deterioration and rather show improvements.

The liquid crystal-polymer composite film according to the present invention can be driven with low power of no higher than 50 Vrms and exhibits memory properties, sufficient contrast and rapid response as well as the characteristic advantage of hybrid type liquid crystal elements in that no polarizing sheet is needed thereby making it feasible to obtain bright display. In addition, the composite film of the present invention has high heat resistance, high mechanical strength, excellent processability, and satisfactory adhesion to a substrate. Therefore, it is applicable to not only light-controlling elements but display elements requiring heat resistance, optical modulation elements, optical shutters, and memory elements. For example, it may be applied to active matrix display elements using TFT or MIM which require low voltage driving. In particular, it is applicable to wide-area display elements (transmission and reflection modes) which have not been achieved without difficulty.

Where a reactive compound, e.g., a polyfunctional isocyanate compound, is used in combination, a composite film with the above-mentioned excellent characteristics can be obtained with ease.

Further, according to the embodiment using a pair of electrode substrates each having a surface comprising a material having a reactive group, an improved adhesion between a substrate and a composite film is assured, and the mechanical strength of the composite film can further be increased.

While the invention has been described in detail and with reference to specific examples thereof, it will be apparent to one skilled in the art that various changes and modifications can be made therein without departing from the spirit and scope thereof.

What is claimed is:

1. A liquid crystal-polymer composite film comprising (1) a compound containing monomer units providing a liquid crystal side chain and monomer units providing a non-liquid crystal side chain and (2) a liquid crystal, said compound (1) and said liquid crystal (2) being in separate phases, and said monomer units providing a non-liquid crystal side chain being crosslinked, wherein (A) the molar ratio of said monomer units providing a liquid crystal side chain to said monomer units providing a non-liquid crystal side chain in said compound (1) is from 0.1/100 to 100/1, (B) the weight ratio of said liquid crystal (2) to said compound (1) is from 1/10 to 50/1, and (C) the molar percentage of said monomer units providing a non-liquid crystal side chain that are crosslinked is from 1 to 100 mol %.

2. A liquid crystal-polymer composite film as claimed in claim 1, wherein said monomer units providing a non-liquid crystal side chain are crosslinked via an isocyanate group.

3. A liquid crystal-polymer composite film as claimed in claim 1, wherein the molar ratio of said monomer units providing a liquid crystal side chain to said monomer units providing a non-liquid crystal side chain in said compound (1) is from 0.1/100 to 50/1.

4. A liquid crystal-polymer composite film as claimed in claim 1, wherein the molar ratio of said monomer units providing a liquid crystal side chain to said monomer units providing a non-liquid crystal side chain in said compound (1) is from 0.1/100 to 10/1.

5. A liquid crystal-polymer composite film as claimed in claim 1, wherein the molar ratio of said monomer units providing a liquid crystal side chain to said monomer units providing a non-liquid crystal side chain in said compound (1) is from 0.1/100 to 5/1.

6. A liquid crystal-polymer composite film as claimed in claim 1, wherein the weight ratio of said liquid crystal (2) to said compound (1) is from 1/5 to 20/1.

7. A liquid crystal-polymer composite film as claimed in claim 1, wherein the weight ratio of said liquid crystal (2) to said compound (1) is from 1/1 to 9/1.

8. A liquid crystal-polymer composite film as claimed in claim 1, wherein the molar percentage of said monomer units providing a liquid crystal side chain that are crosslinked is from 5 to 50 mol %.

9. A liquid crystal-polymer composite film as claimed in claim 1, wherein the compound (1) has a molecular weight of from 10,000 to 1,000,000.

10. A liquid crystal-polymer composite film as claimed in claim 1, wherein the compound (1) has a molecular weight of from 50,000 to 1,000,000.

11. A liquid crystal-polymer composite film as claimed in claim 1, wherein the thickness of the liquid crystal-polymer composite film is from 0.1 to 100 µm.

12. A liquid crystal-polymer composite film as claimed in claim 1, wherein the thickness of the liquid crystal-polymer composite film is from 1 to 50 µm.

13. A liquid crystal-polymer composite film as claimed in claim 1, wherein said compound (1) contains more than one type of monomer unit providing a liquid crystal side chain.

14. A liquid crystal-polymer composite film as claimed in claim 1, wherein said compound (1) contains more than one type of monomer unit providing a non-liquid crystal side chain.

15. A liquid crystal-polymer composite film as claimed in claim 2, wherein said compound (1) is crosslinked with a polyfunctional isocyanate compound.

* * * * *